(12) United States Patent
Floyd et al.

(10) Patent No.: US 6,760,867 B2
(45) Date of Patent: Jul. 6, 2004

(54) GUARANTEED METHOD AND APPARATUS FOR CAPTURE OF DEBUG DATA

(75) Inventors: Michael Stephen Floyd, Leander, TX (US); Balaram Sinharoy, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 555 days.

(21) Appl. No.: 09/801,611

(22) Filed: Mar. 8, 2001

(65) Prior Publication Data

US 2002/0129300 A1 Sep. 12, 2002

(51) Int. Cl.[7] .............................................. G06F 11/00
(52) U.S. Cl. ........................... 714/39; 714/34; 714/45; 714/30; 712/227
(58) Field of Search .......................... 714/39, 733, 30, 714/34, 45; 712/227

(56) References Cited

U.S. PATENT DOCUMENTS

| | | | | | |
|---|---|---|---|---|---|
| 4,674,089 A | * | 6/1987 | Poret et al. | ..................... | 714/28 |
| 5,442,777 A | * | 8/1995 | Nakajima et al. | ............. | 714/20 |
| 5,444,859 A | * | 8/1995 | Baker et al. | ................... | 714/20 |
| 5,541,516 A | * | 7/1996 | Rider et al. | ................. | 324/326 |
| 5,996,092 A | | 11/1999 | Augsburg et al. | ............. | 714/38 |
| 6,094,729 A | * | 7/2000 | Mann | ......................... | 714/25 |
| 6,148,381 A | * | 11/2000 | Jotwani | ...................... | 711/158 |
| 6,243,836 B1 | * | 6/2001 | Whalen | ........................ | 714/45 |
| 6,314,530 B1 | * | 11/2001 | Mann | ........................... | 714/38 |
| 6,457,144 B1 | * | 9/2002 | Eberhard | ...................... | 714/45 |
| 6,523,136 B1 | * | 2/2003 | Higashida | .................... | 714/30 |
| 6,615,370 B1 | * | 9/2003 | Edwards et al. | ............... | 714/45 |
| 2002/0010882 A1 | * | 1/2002 | Yamashita | .................... | 714/45 |
| 2002/0129309 A1 | * | 9/2002 | Floyd et al. | ................. | 714/724 |

* cited by examiner

Primary Examiner—Robert Beausoliel
Assistant Examiner—Yolanda L Wilson
(74) Attorney, Agent, or Firm—Richard F. Frankeny; Winstead Sechrest & Minick P.C.; Casimer K. Salys

(57) ABSTRACT

A writeable K by P trace array with parallel inputs and outputs is incorporated within a VLSI integrated circuit. The trace array is partitioned into N sub-arrays each sub-array having M=P/N entries for the K input signals. Logic circuitry couples selected K input signals to the trace array so that M states of the K input signals may be stored in each of the N sub-arrays. A start signal enables storing of states of the K input signals at time intervals determined by a clock. The clock is counted in a counter and when M is reached the counter is reset back to an initial state. New states of the K input signals written over old states until a pre-determined event signals occurs, at which time storing the sub-array is stopped saving the stored states of the logic inputs. Writing is simultaneously started in a succeeding sub-array in the same fashion until another event signal occurs. The process continues, cyclically repeating the selection of the N sub-arrays until an error signal occurs at which time selected sub-arrays may be read out and the states of the K input signals analyzed.

25 Claims, 6 Drawing Sheets

GUARANTEED METHOD AND APPARATUS FOR CAPTURE OF DEBUG DATA

TECHNICAL FIELD

The present invention relates in general to transient event recording and in particular to capturing the traces of execution cycles in a computer preceding an error condition or failure.

BACKGROUND INFORMATION

Transient event recorders refer to a broad class of systems that provide a method of recording and eventually analyzing signals or events that precede an error or failure condition in logic, electronic, and electro-mechanical systems. Analog transient recorders have existed for years in the form of storage oscilloscopes and strip chart recorders. With the advent of low cost high speed digital systems and the availability of high speed memory, it became possible to record digitized analog signals or digital signals in a non-volatile digital memory. Two problems that have always existed in these transient event recoding systems are the speed of data acquisition and the quality of connection to signals being recorded. Transient event recording systems had to have circuits and recording means that were faster than the signals that were to be recorded, and the signal interconnection could not cause distortion or significant interference with desired signals.

Digital transient event recording systems have been particularly useful in storing and displaying multiple signal channels where only timing or state information was important and many such transient event recording systems exist commercially. With the advent of very large scale integrated circuits (VLSI), operating at high speeds, it has become very difficult to employ transient event recording techniques using external instrumentation. The signals to be recorded or stored could not be contacted with an external connection without a degradation in performance. To overcome this problem, trace arrays have been integrated on the VLSI chip, along with functional circuits, to facilitate the recording of signals relevant to occurring failures. Another problem that occurs when trying to use transient event recording techniques for VLSI circuits is that the trigger event, which actually began a process leading to a particular failure, sometimes manifests itself many cycles ahead of the observable failure event.

For hardware debugging of a logic unit in a VLSI microprocessor, a suitable set of control and/or data signals may be selected from the logic unit and put on a bus called the unit debug bus. The contents of this bus at successive cycles may be saved in a trace array. Since the size of the trace array is usually small, it can save only a few cycles worth of data from the debug bus. Events are defined to indicate when to start and when to stop storing information in the trace array. For example, an event trigger signal may be defined when a debug bus content matches a predetermined bit string "A". For example, bit string "A" may indicate that a cache write to a given address took place and this may be used to start a tracing (storing data in the trace array). Another content, bit string "B", may be used to stop storing in the trace array when it matches a content of the debug bus.

In some cases, the fault in the VLSI chip manifests itself at the last few occurrences of an event (for example, during one of the last times that a cache write takes place to a given address location, the cache gets corrupted). It may not be known exactly which of these last few occurrences of the event manifested the actual error, but it may be known (or suspected) that the error was due to one of the last occurrences. Sometimes there is no convenient start and stop event for storing in the trace array. Because of this, it is difficult to capture the trace that shows the desired control and data signals for the cycles immediately before the last few occurrences of the events. This may be especially true if system or VLSI behavior changes from one program run to the next.

The performance of VLSI chips is difficult to analyze and failures that are transient, with a low repetition rate, are particularly hard to analyze and correct. Analyzing and correcting design problems that manifest themselves as transient failures are further exacerbated by the fact that the event that triggers a particular failure may occur many cycles before the actual transient failure itself. There is, therefore, a need for a method and system for recording those signals that were instrumental in causing the actual transient VLSI chip failure.

SUMMARY OF THE INVENTION

A trace array is integrated onto a VLSI chip for storing and playing back a sequence of digital events that occurred prior to an error condition. The trace array is partitioned into N sub-arrays each having a storage for M entries. The trace array is combined with circuits that enable signals to be directed to a particular sub-array in response to logic states that are predetermined to be suspect in causing a later succeeding actual fault or error. Signals are directed to a sub-array and that sub-array records in a wrapping mode (old data is over written with new data) until a predetermined suspect event signal occurs at which time recording is stopped. Recording is then switched to another sub-array which continues recording in the same wrapping mode until a suspect event or an actual error signal occurs. The P sub-arrays that have been written into at the time of an error contain trace data preceding each of the corresponding P events signals that occurred prior to the actual error condition. If P exceeds N, indicating that an error has not occurred since the preceding N event signals, then logic directs the recording of signal states back to the first of the N sub-arrays where recording began. In this manner, the states of input signals, for the N events preceding an actual error and their M corresponding entries, are saved for analysis.

Another embodiment of the present invention uses an analog to digital converter (A/D) to convert an analog to an A/D signal. The A/D signal is stored along with selected logic signals in a stand-alone trace array (not in a VLSI chip) for debugging an electro-mechanical system. The digitized analog signal and logical signals are stored in a partitioned trace array according to embodiments of the present invention. Multiple A/D converters may be used if multiple analog signals are to be used in the debugging process.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
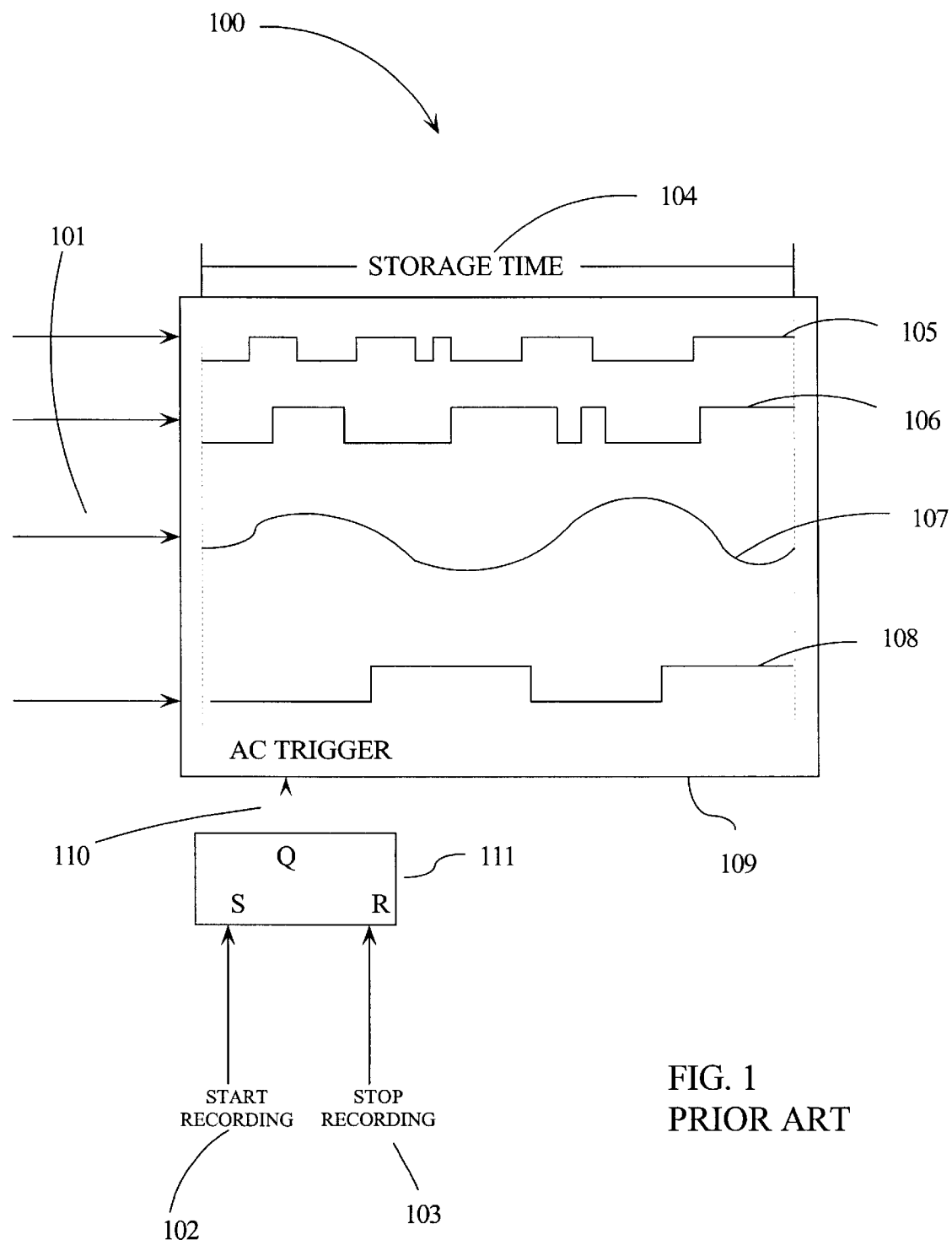
FIG. 1 is a prior art block diagram of a transient event recording system.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 is a simple block diagram of a transient event recoding system 100 that maybe found in the prior art. A transient event recorder 109 has four inputs 101 with a storage time 104. For example, transient event recorder 109 may be a storage oscilloscope with storage traces and a sweep time equal to storage time 104. Assuming latch 111 starts in a reset state, a start recording signal 102 is used to set the latch 111 generating a trigger output 110 which triggers storage oscilloscope 109. Inputs 101 will continue to record on the cathode ray tube (CRT) of storage oscilloscope 109 for the duration of the sweep time or storage time 104. If trigger 110 is an alternating current (AC) trigger requiring a transition, then the information will remain stored on the CRT until a stop recording signal 103 resets latch 111 and allows a new start recording signal 102 to again cause a transition and a new storage cycle. In this example, transient event recorder 109 is recording digital signals 105, 106 and 108 and an analog signal 107.

Figure 2:
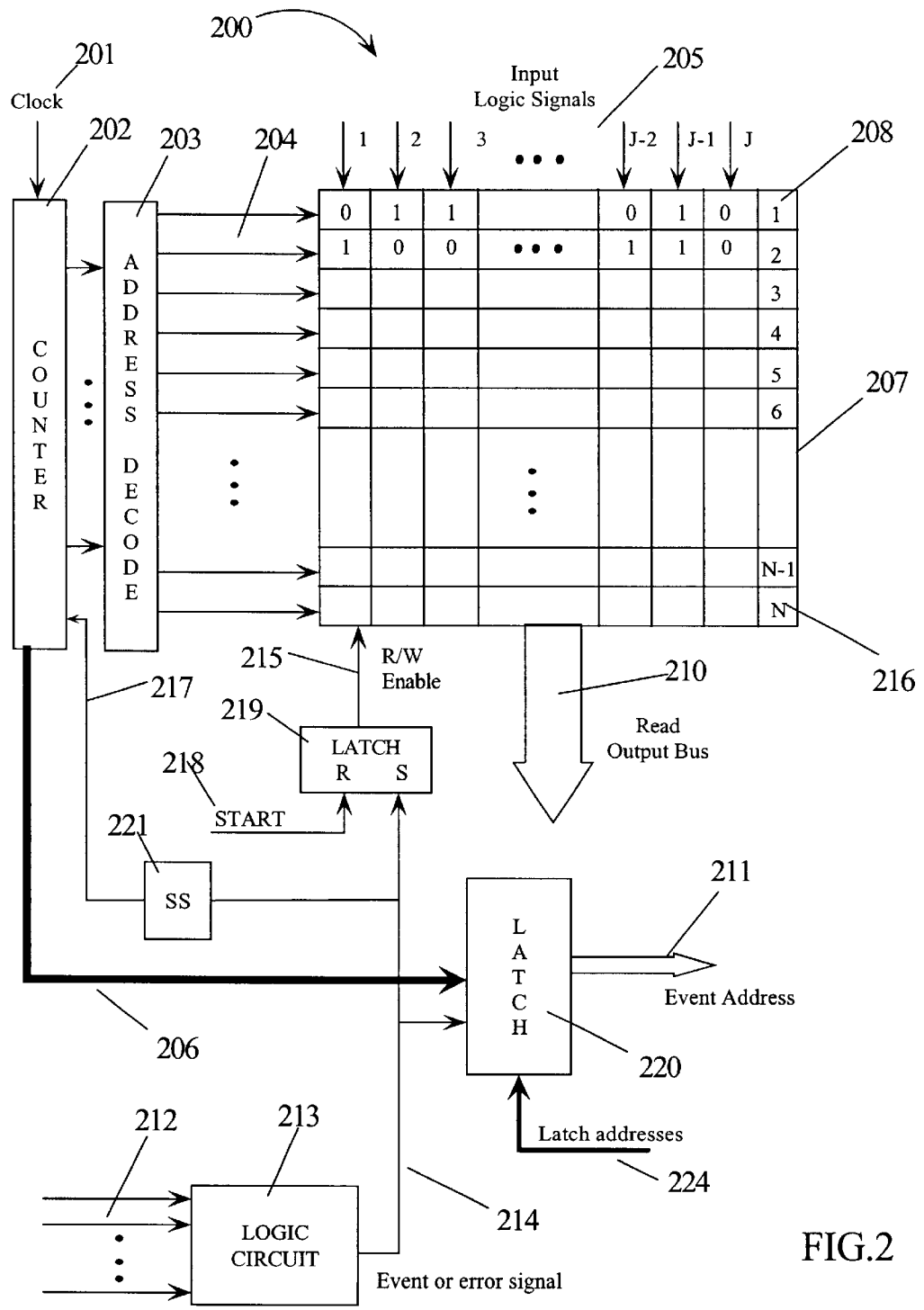
FIG. 2 is a block diagram of a transient event recording system.

FIG. 2 is a block diagram of a digital transient event recorder 200 that may be used for debugging digital circuits. A memory array (trace array) 207 has entries 208 through 216 (1 through N) and J input logic signals 205 (1 through J). The individual entries (e.g., entry 208) are addressed by address decoder 203 with address signals 204. A counter 202, for example, may be used to sequence through the N addresses of trace array 207. Counter 202 receives clock input 201 and is configured so that when it reaches the end of its count (N) it automatically resets to one and counts up to N again. In this manner, the addresses for trace array 207 cycle from one to N and then repeat. If read/write enable (R/W) 215 is set to write, then trace memory 207 will record in a wrapping mode with old data being written over by new data. Clock 201 converts the entries one through N to a discrete time base where trace memory 207 stores the states of logic input signals 205 at each discrete time of the clock 201. If read/write enable 215 is set to read, then as counter 202 causes the addresses 204 to cycle, the contents of trace memory 207 may be read out in parallel via read output bus 210. If an edge triggered single shot (SS) circuit 221 is used to generate a reset 217 to counter 202 each time read/write enable 215 changed states, then counter 202 would start at a one count and trace memory 207 would be read from or written into starting from address one. In the read mode, trace memory 207 would be continuously read out cycling from entry 208 through 216 and back to entry 208. The write mode will likewise loop through the addresses and new data will overwrite old data until an error or event signal 214 resets latch 219 and trace memory 207 is set to the read mode. Trace memory 207 will retain the N logic state time samples of logic inputs 205 which occurred preceding the error or event 214. The error or event 214 may be generated by a logic operation 213 on inputs 212. The outputs of counter 202 are also coupled to parallel latch 220. When error or event 214 occurs, the counter 202 outputs and thus the address of trace memory 207 being written into is latched in latch 220 storing event address 211. Event address 211 may be compared to the counter output during a cyclic read of trace memory 207 to determine the actual logic states of logic inputs 205 when the error or event signal 214 occurred. Event address 211 may also be stored in a circuit that may be indexed up or down around event address 211 to generate a signal to synchronize with time samples of logic input 205 before event signal 214.

Figure 3:
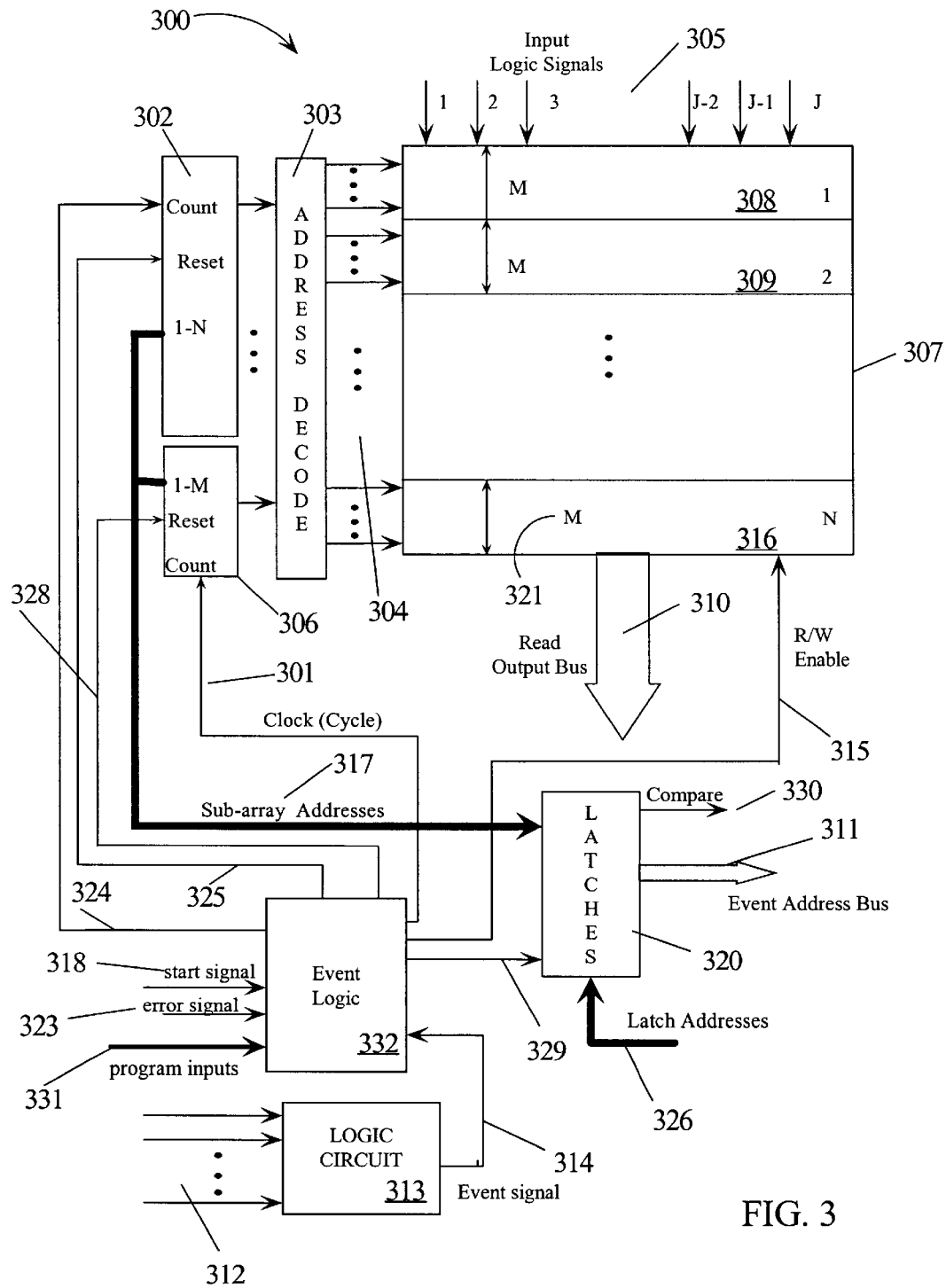
FIG. 3 is a block diagram of a transient event recording system according to one embodiment of the present invention.

FIG. 3 is a block diagram of transient event recoding system 300 according to embodiments of the present invention. Trace memory array 307 may be incorporated into a VLSI processor chip (not shown) which has input logic signals 305 which are traced as part of a debugging process. Trace memory array 307 is partitioned into N sub-arrays (e.g., sub-arrays 308, 309, and 316) each with M entries 321. The outputs of counters 302 and 306 form the inputs to address decoder 303 which generates the addresses for the entries of trace array 307. Counter 302 causes the address decoder 303 to cycle to each of the N sub-arrays and counter 306 cycles through the M entries of each of the N sub-arrays. Read/write (R/W) enable 315 determines if trace array 307 and thus the N sub-arrays are in a read or a write mode. A start signal 318 enables event logic 332 to generate reset signals 325 and 328 and count signal 324, depending on program inputs 331 and event signal 314. Initially one of the N sub-arrays would be selected by an output of counter 302 via address decoder 303. For example, counter 302 selects sub-array 308 and R/W enable 315 sets trace array 307 into the write mode. Reset signals 325 and 328 would be removed from counter 302 and 306. As clock 301 cycles counter 306 from a count of one to M, the states of logic inputs 305 are time sampled and stored in entries, one through M, within sub-array 308. If an event signal 314 is received, counter 302 is indexed by one causing address decode 303 to select another sub-array, for example sub-array 309. Event logic 332 resets counter 306 so counting of clock 301 begins at an initial entry of sub-array 309. Since the addresses of sub-array are no longer selected, (counter 302 was indexed) the contents of sub array 308 are saved. Sub-array 309 stores time samples of states of logic inputs 305, writing new states over old states, until another event signal 314 is received in event logic 332. Each new event signal 314 will cause another sub-array to be selected to states of input logic signals 305. This operation will continue in the described fashion until an error signal 323 is received in event logic 332. An error signal 323 will set R/W enable 315 to a read mode preventing further storing and saving all acquired logic states. The logic states stored in trace memory 307 may be read out via read output bus 310. Read out of trace array 307 may done by resetting the counter 302 to an initial state and using the clock to cycle through the addresses. Read out of trace array 307 may also be done in a single cycle mode where trace entries are read out one at a time. The single trace entries may be analyzed, stored externally, or sent to a logic analyzer display. In another embodiment of the present invention, read out starts at the next sequential address after a trace recording has stopped. This starts read out at the first of the N entries preceding the error that stopped recording thereby allowing the trace data to be presented or stored in the same order that it was received.

Each time an event signal 314 occurs, event logic 332 may generate a signal 329 that also gates latches 320 to store the output states of counters 302 and 306 (sub-array addresses 317) thereby saving the address of trace memory 307 which was being used to store states of input logic signals 305 when the event signal 314 occurred. Likewise, event signal 314 signals event logic 332 to generate a reset pulse 328 to counter 306 forcing it to select a first or a predetermined entry of the sub-array selected by counter 302. Resetting counter 306 causes the read or write to a sub-array to begin at the first of the M entry positions. Event signal 314 may be derived by the logic combination of inputs 312 in logic circuit 313. Counter 302 is reset with signal 325 whenever a new tracing routine begins or all N sub-arrays have been recorded without receiving an error signal 323. Other embodiments of the present invention use the event signal 314 to save a particular address of trace array 307 or to write some unique data event signal in trace array 307 for use as a later read out reference point.

When error signal 323 signals an actual error condition, trace memory 307 has stored each preceding suspect event signaled by event signal 314 and the corresponding M cycle traces for each sub-array stored for analysis. This ensures that the M states of each of the input logic signals 305, corresponding to the occurrences of event signals 314 and the actual error signal 323, have been stored. After an error 323 has occurred, the contents of trace array 307 may be read out on read bus 310 by enabling a read mode with R/W enable 315 and sequencing the counters 302 and 306. Latch addresses 326 may be used to select stored event addresses for read out on event address bus 311. Event addresses 311 may be compared (generating compare signal 330) to addresses generated by counter 302 and 306 during readout to identify states of input logic signals 305 that occurred when and event signal 314 or and error signal 323 occurred. The sequences of states of input logic signals 305 that occurred at event signals 314 preceding an actual error 323 may be analyzed to debug a system.

The granularity of partitions (value of N) of trace array 307, according to embodiments of the present invention, extends to N equal two. A trace array 307 partitioned in two equal parts allows the largest number of entries (M) for each sub-array while guaranteeing that the M states of the last event signal 314 preceding an actual error signal 323 are stored. The value of N determines how many events prior to the last event causing an error are saved for analysis. If N equals two then the (M×N/2) trace entries preceding the event signal 314 before an error signal 323 are guaranteed to be saved. If N equals four, then up to (M×N/4) trace entries prior to the error signal 323 and the M×N/4 trace entries of the last three event signals 314 are guaranteed to be saved. Embodiments of the present invention allow the counter 302 and 306 to be programmed to configure trace array 307 for different tracing tasks.

It should be noted that a variety of counter configurations may be used for counters 302 and 306 and still be within the scope of the present invention. While the M traces corresponding to each event signal 314 preceding an error 323 are stored sequentially, they need not be stored in sequential sub-arrays of trace array 307. All that is, necessary is that the read out sequence of sub-arrays occur in the same order that the sub-arrays were stored. Hardware implementations of embodiments of the present invention may use counters or indexing means that selects the sub-arrays in a non-sequential order during the process of storing states of logic inputs 305. If the same counters or indexing means are used to select the sub-arrays during read of stored states of logic inputs 305, then the actual of sequences of event signals 314 and the corresponding groups of M stored traces will be preserved.

In one embodiment of the present invention, trace memory array 307 is partitioned into N+1 smaller sub-arrays, where N+1 is a power of two. Initially a start signal 318 would enable capturing M trace entries in sub-array 308 (sequential sub-array 1). In this embodiment, every time an event signal 314 occurs, the counter 302 will activate a next sub-array in a round robin fashion. That is, if the trace entries are being stored in a sub-array "p", then after the next event signal, the trace entries will begin in sub-array "q", where q=(p+1)modulo(N+1). Counter 302 would be configured to index in this fashion. As before, at the occurrence of an error signal 323, the N sub-arrays after the last written sub-array contain the states of input logic signals 305 for the last N event signals received before error signal 323.

Since trace array 307 is partitioned into (N+1) smaller sub-arrays, each sub-array can only capture a small number of cycles (trace entries) relative to the entire trace array 307. However, unlike the non-partitioned trace array 207 (FIG. 2), the method according to embodiments of the present invention, guarantees that the trace entries for the last N occurrences of the event signal 314 have been saved in trace memory array 307. This guarantee is important for determining bugs that are elusive and manifest themselves after a long runtime. Embodiments of the present invention would do especially well in a debugging environment when error conditions do not repeat in the same way each time.

Figure 4:
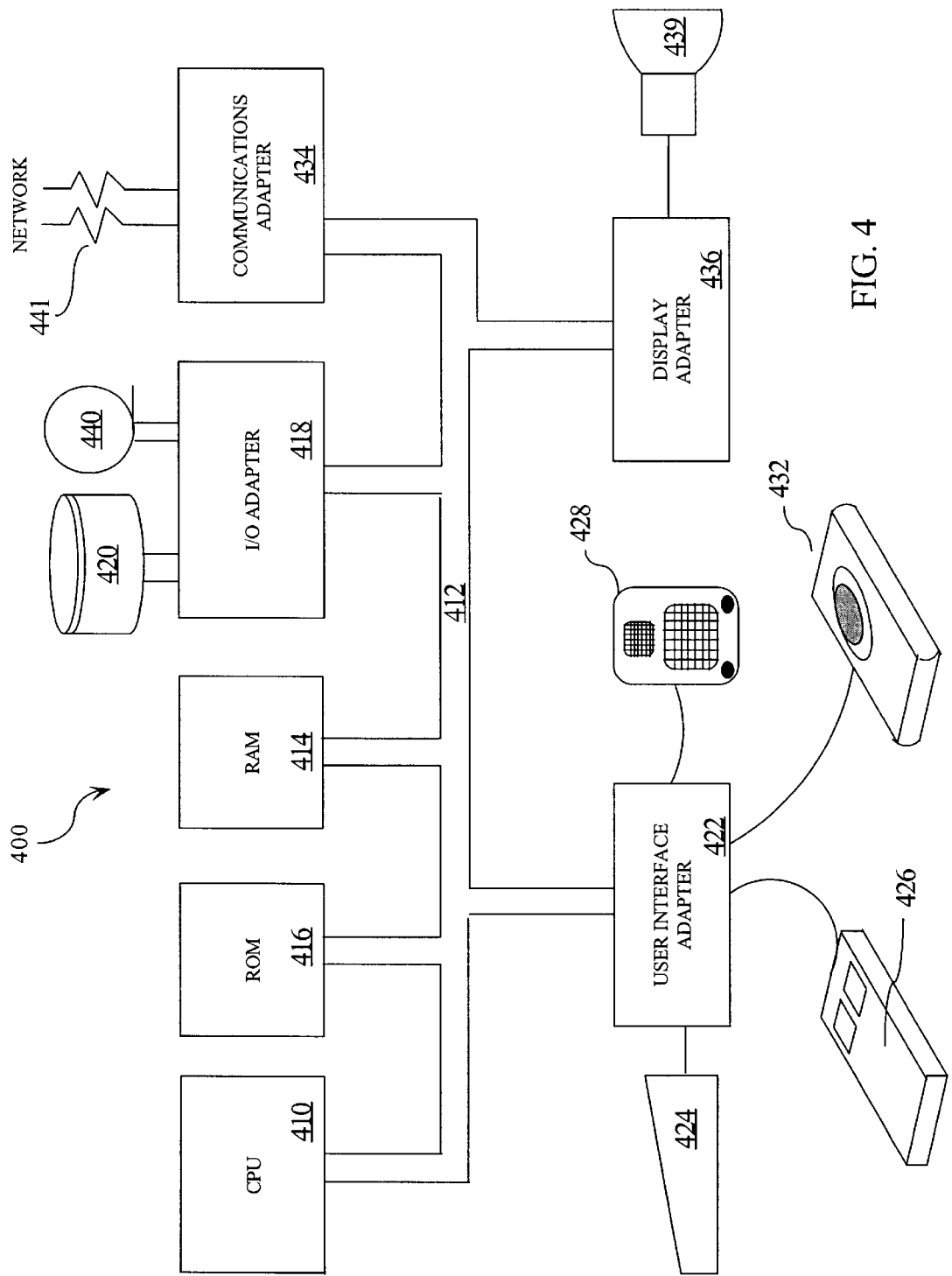
FIG. 4 is a block diagram of a data processing system which may have a VLSI processor chip which uses trace arrays according to embodiments of the present invention.

FIG. 4 is a high level functional block diagram of a representative data processing system 400 suitable for practicing the principles of the present invention. Data processing system 400, includes a central processing system (CPU) 410 operating in conjunction with a system bus 412. CPU 410 may employ a VLSI processor chip which uses debug methods and circuits according to embodiments of the present invention. System bus 412 operates in accordance with a standard bus protocol, such that as the ISA protocol, compatible with CPU 410. CPU 410 operates in conjunction with read-only memory (ROM) 416 and random access memory (RAM) 414. Among other things, ROM 416 supports the Basic Input Output System (BIOS). RAM 414 includes, DRAM (Dynamic Random Access Memory) system memory and SRAM (Static Random Access Memory) external cache. I/O Adapter 418 allows for an interconnection between the devices on system bus 412 and external peripherals, such as mass storage devices (e.g., a hard drive, floppy drive or CD/ROM drive), or a printer 440. A peripheral device 420 is, for example, coupled to a peripheral control interface (PCI) bus, and I/O adapter 418 therefore may be a PCI bus bridge. User interface adapter 422 couples various user input devices, such as a keyboard 424, mouse 426, touch pad 432 or speaker 428 to the processing devices on bus 412. Display adapter 436 supports a touch screen display 438 for acquiring touch data according to embodiments of the present invention. Display 439 which may be, for example, a cathode ray tube (CRT), liquid crystal display (LCD) or similar conventional display units. Display adapter 436 may include among other things a conventional display controller and frame buffer memory. Data processing system 400 may be selectively coupled to a computer or telecommunications network 441 through communications adapter 434. Communications adapter 434 may include, for example, a modem for connection to a telecom network and/or hardware and software for connecting to a computer network such as a local area network (LAN) or a wide area network (WAN). CPU 410 may comprise a VLSI chip that has a trace array and associated circuits according to embodiments of the present invention. Logic signals of circuits being debugged are directed to a buss coupled to the input of trace array 307 and states of the input logic signals 305 may be stored and analyzed according to embodiments of the present invention.

Figure 6:
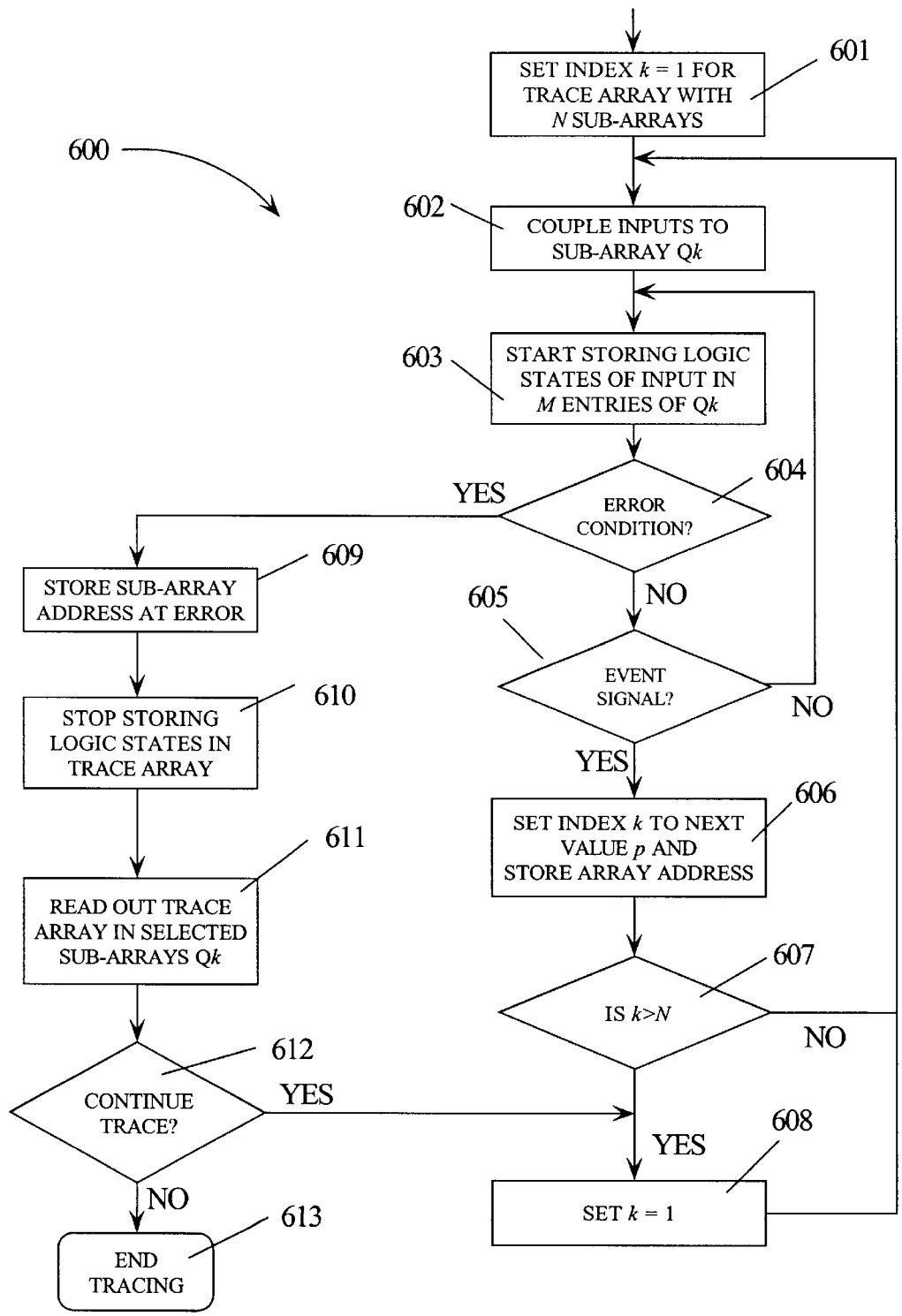
FIG. 6 is a flow diagram of method steps according to embodiments of the present invention.

FIG. 6 is a flow diagram of method steps used in embodiments of the present invention. The flow diagram in FIG. 6 is for a trace memory array 307 partitioned into N sub-arrays where N is an integer greater than one. In step 601, an index k associated with each sub-array is set so the first sub-array is selected. In step 602, the input logic signals 305 are coupled to the sub-array Q1 (Qk with k=1). For the embodiment in FIG. 307 this entails generating the appropriate address decode 303. In step 603, states of input logic signals 305 are stored in entries 1 to M in the selected sub-array Q1 (e.g., sub-array 308). A test is done in step 604 to determine if error signal 323 has occurred indicating an error condition. If the result of the test in step 604 is NO, then event signal 314 is tested in step 605 to determine if there is an event condition. If the result of the test in step 605 is NO, then states of input logic signals 305 continue to be stored in step 603 in a cyclic manner where new states overwrite old states in sub-array Qk (e.g., sub-array 308). If the result of the test in step 605 is YES, then in step 606 the index k is set to the next value p and the event address 206 for the entry of the sub-array Qk being written is saved in latch 320. In step 607, a test is done to determine if k>N. If the result in step 607 is NO, then input logic signals 305 are coupled (by selecting a corresponding address) to sub-array Qp and steps 603, 604 and 605 are repeated awaiting another event signal 314 or error condition 323. If the result of the test in step 607 is YES, then the number (N) of sub-arrays in trace array 307 has been exceeded and the index k is set back to one and the sub-array sequence is repeated until an error condition 323 is received. If the result of the test in step 604 is YES, then the sub-array address where the error condition 323 occurred is recorded in step 609. In step 610, the storing of states of input logic signals 305 is stopped. In step 611, selected sub-arrays Qk of trace array 307 are read out to analyze the error condition. In step 612, a test is made to determine if tracing is to continue. If the result of the test in step 612 is NO, then the process is ended in step 613. If the result of the test in step 612 is YES, then index k is set back to one in step 608 and the steps 602 through 613 are repeated as indicated with the same or newly selected input logic signals 305.

Figure 5:
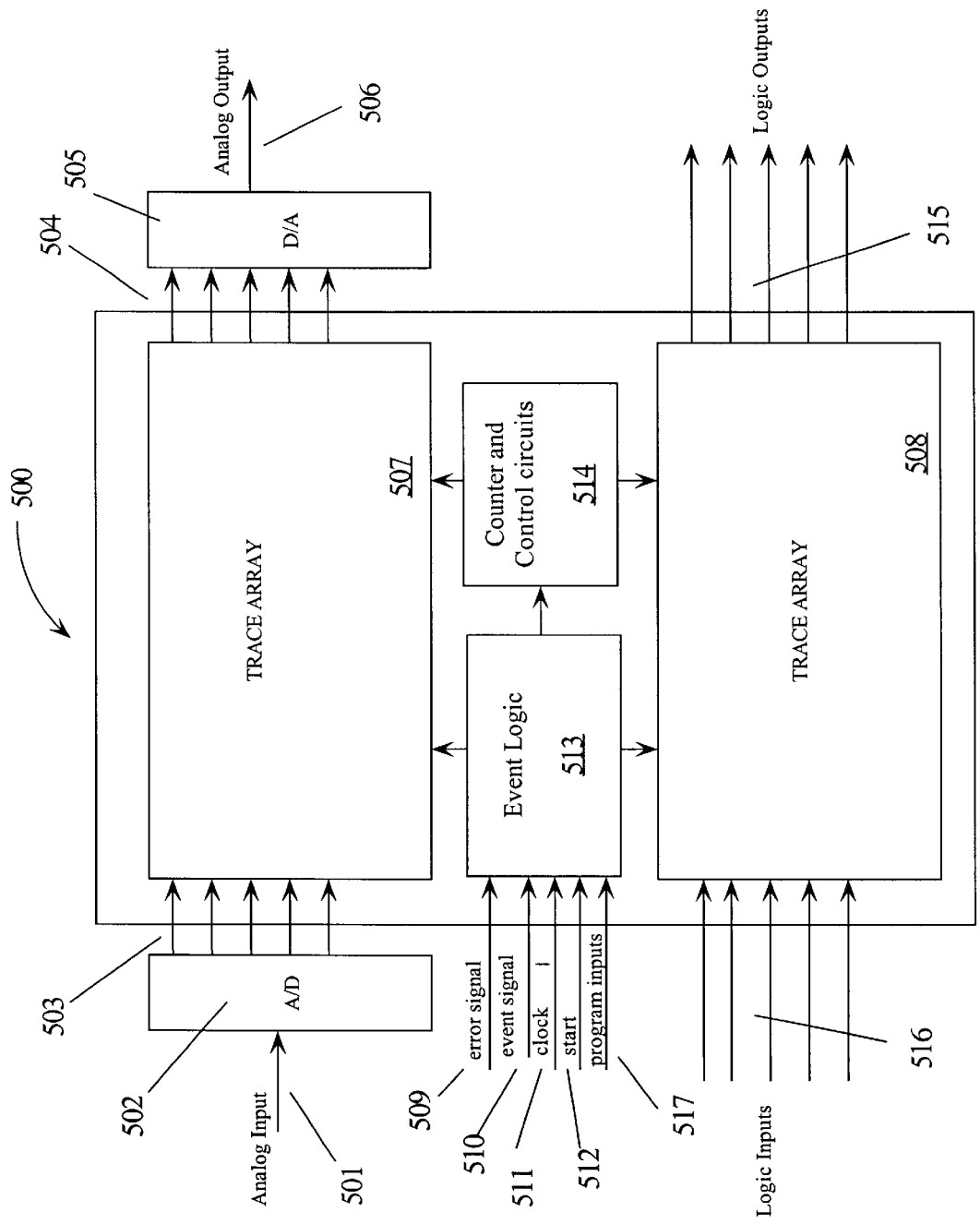
FIG. 5 is a block diagram where an analog to digital converter is used to enable analog signals to be used in a partitioned trace array according to embodiments of the present invention.

FIG. 5 is another embodiment of the present invention where two trace arrays 507 and 508 are configured like trace arrays 300 in FIG. 3 and according to embodiments of the present invention for an analog and digital debugging system 500. In this embodiment, a trace array 507 is used for an analog signal 501 and trace array 508 is used for logic signals 516. Analog to digital converter 502 converts the analog signal to logic signals 503. Trace arrays 507 and 508 are operated as described in FIG. 3 and logic signals 504 corresponding to analog signal 501 and logic inputs 516 are stored until an error signal 509 occurs. The logic outputs 515 and the analog output 506 are read out for analysis. A start signal 512 is used in event logic 513 to generate signals to start both trace arrays 507 and 508. Event signal 510 is used to switch the sub-arrays in trace arrays 507 and 508 and clock signal 511 is counted to generate addresses for trace arrays 507 and 508 as was done for trace array 307 in FIG. 3. Multiple analog channels may be employed by duplicating A/D converter 502, trace unit 507 and D/A converter 505. If trace array 507 has sufficient number of inputs 503, then analog and digital signals may be recorded in one trace array 507.

The embodiment of the present invention in FIG. 5 is useful in debugging an exemplary electro-mechanical system where a mechanical device (not shown), undergoing multiple moves, is being observed. The mechanical device may start and complete a mechanical move in response to corresponding start and stop motion signals. The performance of the mechanical device depends on initial conditions when a move is made. For example, a mechanical device may have a varying initial position and velocity which may affect the dynamics of a particular move. The mechanical device may fail after a number of successive moves (e.g., does not arrive at a prescribed position at a prescribed time, with a prescribed velocity) and it is desirable to have stored the states of analog and digital signals corresponding to the motion of mechanical device and its control circuits preceding an actual failure. Embodiments of the present invention, described in FIG. 3 and FIG. 5, enable a number of events preceding an event in which a failure occurred to be stored and analyzed to debug an electro-mechanical system. Embodiments of the present invention work well in capturing states of input signals 501 and 516 that immediately precede the error signal 509.

Although the present invention and its advantages have been described in detail, it should be understood that various changes, substitutions and alterations can be made herein without departing from the spirit and scope of the invention as defined by the appended claims.

What is claimed is:

1. A method for debugging a system comprising:

1) coupling first signals to a re-writeable trace array, said trace array partitioned into N sub-arrays, said N sub-arrays each having M storage locations, each of said M storage locations selected by selecting one of corresponding M storage addresses;

2) storing states of said first signals in a selected sub-array K of said N sub-arrays by selectively indexing said M storage addresses of said sub-array K, cyclically repeating storage addresses when M states of said first signals have been stored;

3) stopping said storing step 2) in response to an event signal and indexing K, wherein indexes K are cyclically repeated after N sub-arrays have been selected; and 4) repeating steps 1) through 3) until stopped by an error signal.

2. The method of claim 1, further comprising the step of:
storing an event storage address in response to receipt of said event signal or said error signal, said event storage address corresponding to a storage address of sub-array K which is storing states of said first signals when said event signal or said error signal occurred.

3. The method of claim 2, further comprising the steps of:
reading stored states of said first signals from a first selected sub-array of said N sub-arrays; and
analyzing said stored states of said first signals to debug said system.

4. The method of claim 3, wherein said stored event storage address is compared to a read storage address of said first selected sub-array during reading said stored states of said first signals, a comparison match of said stored event storage address to said read storage address corresponding to event or error states of said first signals.

5. The method of claim 1, wherein said system is a very large scale integrated circuit (VLSI) chip.

6. The method of claim 5, wherein said re-writeable trace array is included within said VLSI chip.

7. The method of claim 1, wherein said event signal is generated in response to a combination of circuit states occurring within said system.

8. The method of claim 1, wherein said combination is a logic combination.

9. The method of claim 1, wherein said first signals comprise logic signals and digitized analog signals.

10. An apparatus for debugging a system comprising:
a re-writeable trace array partitioned into N sub-arrays, said N sub-arrays each having M storage locations, each of said M storage locations selected by selecting a one of corresponding M storage addresses;
a bus circuit operable to couple first signals to an address selectable sub-array K of said N sub-arrays;
a storage circuit operable to store states of said first signals in said selected sub-array K by selectively indexing said M storage addresses of said sub-array K, cyclically repeating said M storage addresses when M states of said first signals have been stored;
a stop circuit operable to stop storing states of said first signals in response to an event signal and indexing K thereby selecting a subsequent one of said N sub-arrays, wherein indexes K are cyclically repeated after N sub-arrays have been selected; and
a read circuit operable for reading the contents of selected ones of said N sub-arrays.

11. The apparatus of claim 10, further comprising an address store circuit operable to store an event storage address in response to receipt of said event signal or said error signal, said event storage address corresponding to a storage address of said sub-array K which is storing states of said first signals when said event signal or said error signal occurred.

12. The apparatus of claim 11, further comprising a compare circuit operable to compare said event storage address to a read storage address of said first selected sub-array during reading said stored states of said first signals, a comparison match of said event storage address to said read storage address corresponding to event or error states of said first signals.

13. The apparatus of claim 10, wherein said system is a very large scale integrated circuit (VLSI) chip.

14. The apparatus of claim 13, wherein said re-writeable trace array is included within said VLSI chip.

15. The apparatus of claim 10, wherein said event signal is generated in response to a combination circuit states within said system.

16. The apparatus of claim 15, wherein said combination is a logic combination.

17. The apparatus of claim 10, wherein a content of selected sub-arrays of said N sub-arrays are analyzed to debug said system.

18. A data processing system comprising:
a central processing unit (CPU);
shared random access memory (RAM);
read only memory (ROM); and
a bus system coupling said CPU to said ROM and said RAM, wherein said CPU further comprises:
a very large scale integrated (VLSI) chip, said VLSI chip comprising a debugging system for debugging circuits within said chip said debugging system comprising;
a re-writeable trace array partitioned into N sub-arrays, said N sub-arrays each having M storage locations, said M storage locations having corresponding addresses between and including a starting and an ending address, each of said N sub-arrays having a read state when containing stored traces and a write state when free;
a bus circuit operable to couple first logic signals to an address selectable sub-array K of said N sub-arrays;
a storage circuit operable to store states of said first signals in a selected sub-array K of said N sub-arrays by selectively indexing said M storage addresses of said sub-array K, cyclically repeating storage addresses when M states of said first signals have been stored;
a stop circuit operable to stop storing states of said first logic signals in response to an event signal and indexing K thereby selecting a subsequent one of said N sub-arrays, wherein indexes K are cyclically repeated after N sub-arrays have been selected; and
a read circuit operable for reading the contents of selected ones of said N sub-arrays.

19. The data processing system of claim 18, further comprising an address store circuit operable to store an event storage address in response to receipt of said event signal or said error signal, said event storage address corresponding to a storage address of sub-array K which is storing states of said first signals when said event signal or said error signal occurred.

20. The data processing system of claim 19, further comprising a compare circuit operable to compare said event storage address to a read storage address of said first selected sub-array during reading said stored states of said first signals, a comparison match of said event storage address to said read storage address corresponding to event or error states of said first signals.

21. The data processing system of claim 18, wherein said system is a very large scale integrated circuit (VLSI) chip.

22. The data processing system of claim 21, wherein said re-writeable trace array is included within said VLSI chip.

23. The data processing system of claim 18, wherein said event signal is generated in response to a combination of circuit states within said system.

24. The data processing system of claim 23, wherein said combination is a logic combination.

25. The data processing system of claim 18, wherein a content of selected sub-arrays of said N sub-arrays are analyzed to debug said system.

* * * * *